3,249,670
PLASTIC TUBE EXTRUSION PROCESS

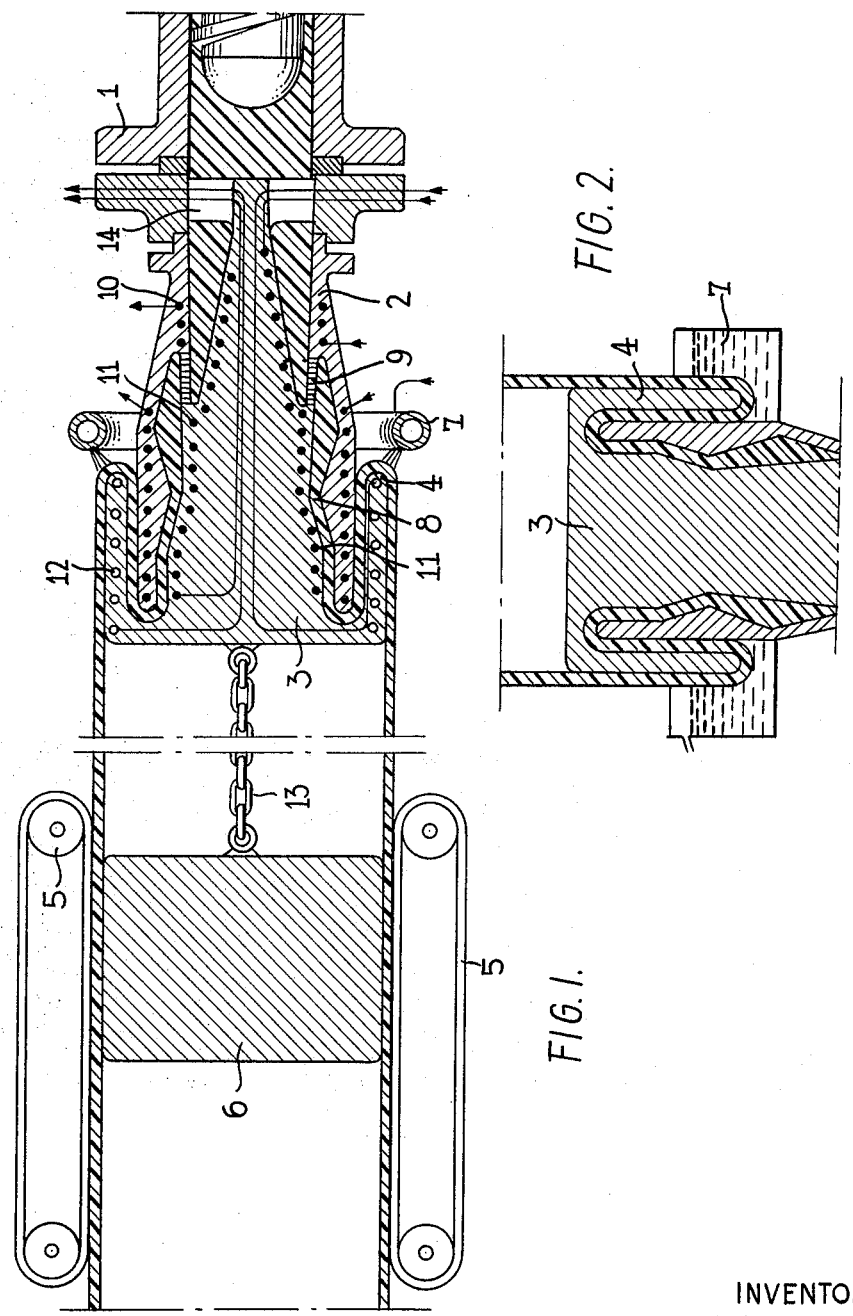

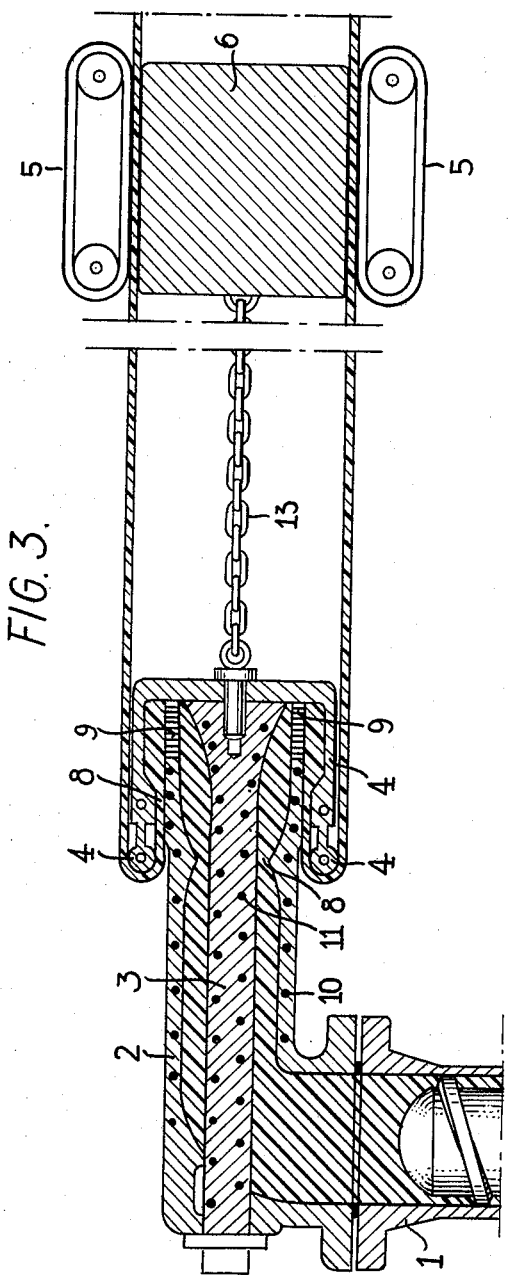

Emil Rottner and Hans-Otto Schiedrum, Frankfurt am Main, Germany, assignors to Farbwerke Hoechst Aktiengesellschaft vormals Meister Lucius & Bruning, Frankfurt am Main, Germany, a corporation of Germany
Filed Feb. 5, 1962, Ser. No. 171,787
Claims priority, application Germany, Feb. 3, 1961, F 33,121
3 Claims. (Cl. 264—209)

The present invention provides a process for the continuous manufacture of thin-walled tubes of high strength from thermoplastic materials.

It is known to stretch and thereby to strengthen thin-walled tubes of plastic material by turning them inside out in a special operation additional to the extrusion operation. This known process which has been described in German Patent 1,056,815 can, however, only be applied for tubes of relatively small length. The tools which are necessary for use in carrying out the aforesaid process have twice the length of the tube when they are drawn out, that is to say at the beginning or at the end of the stretching operation. If the process is to be repeated another tool of the same bulky form is required. Moreover, equally expensive devices are necessary for the additional heating and for maintaining the temperature.

It is the object of the present invention to provide a process for the continuous manufacture of tubes of thermoplastic material of high strength and having any desired length.

In order to carry out the invention a process is applied wherein the thermoplastic material which has been treated on an extruder in known manner and shaped in the orifice of an extrusion die provided with a mandrel is subjected to a twofold reversal of the direction of flow to the outside while the pressure of the extruder is made use of and simultaneously mechanical drawing forces are applied, the beginning of solidification of the mass being adjusted by an appropriate regulation of the temperature so as to occur at a certain point between the first and the second reversal of direction.

Owing to this measure, the operations of extruding and stretching form a continuous cycle of operation. As compared to the tubes extruded in known manner, the degree of strengthening of the tubes prepared according to the present invention amounts to up to 150%. The temperature prevailing along the stream of thermoplastic material and at all places of its cross-sectional area can be controlled in known manner and by simple means, for example by the arrangement of electrical heating elements. By the appropriate arrangement of the heating elements and/or by their appropriate operation, the state of the beginning of solidification can easily be delayed to a certain point of the passage of the thermoplastic material and be maintained for a distance which can exactly be determined. This heating means also enables the process to be conducted in such a manner that the beginning of the solidification of the thermoplastic material is delayed to a place directly in the first reversal of direction or in the course of the second reversal of direction of flow of material. Thus, the process according to the invention can be adapted to the different thermal and mechanical properties of the various thermoplastic materials.

For the purpose of conducting the extruded tube after the second reversal of direction under definite conditions of temperature, the tube can be subjected to the direct exchange of heat with a gas or a liquid, for example, air or water.

When thin-walled tubes of thermoplasts are to be manufactured it may be advantageous to divide up the stream of thermoplastic material in the first reversal of direction into a plurality of partial streams (see FIGURE 3) and to reunite them immediately thereafter by compression in longitudinal direction. Thereby the whole stream of the thermoplastic material is again kneaded thoroughly and homogenized before the second reversal of direction. Irregularities in the composition of the thermoplastic material and in the distribution of temperature can be removed in this way. The thermoplastic material can then be stretched to a high extent in a tangential direction and in an axial direction in the second reversal of direction. The degrees of strengthening which may be attained are accordingly higher.

Apparatus suitable for use in carrying out the process in accordance with the present invention is shown diagrammatically, and by way of example only, in the accompanying drawings of which FIGS. 1 to 3 represent longitudinal elevations in section of the device used according to the present invention.

The process according to the invention is advantageously carried out with the use of an apparatus as shown in FIGURE 1. The apparatus according to the invention comprises an extruder 1 provided with a heatable die opening consisting of a jacket 2 and a mandrel 3 having a circumferential lip 4 which extends back along the outer end of the extrusion die. The apparatus further comprises a drawing device consisting of conveying elements 5 and a core 6 which is connected with mandrel 3 by a retaining means such as a rope, rod, or chain 13. In addition, it includes a cooling device 7 arranged at the free end of lip 4.

Extruder 1 can be designed in known manner, for example in the form of a screw extruder having one or more screws. Mandrel 3 may be provided with electrical heating elements 10. Alternatively it may be provided with channels which may be charged, for example, with a liquid heat carrier. The supply and discharge pipes for the heating may be positioned in arms 14 which serve to support the mandrel in the die opening or in a special intermediate piece. Lip 4 of mandrel 3 can extend around the end of jacket 2 as is shown or, in order to facilitate the construction and to improve the accessibility, a special cap piece may be substituted for the lip 4 which is connected with mandrel 3 so as to be detachable.

In extruder 1, of which the terminal section only is represented in FIGURE 1, the thermoplastic material, for example, homopolymers of ethylene and propylene or copolymers of ethylene and propylene, especially those prepared by the Ziegler polymerization process, is continuously mixed, plasticized and homogenized in known manner. The material which has thus been prepared is introduced by the screw of the extruder, for example a single-screw extruder under pressure into the clearance between jacket 2 and mandrel 3 of the extrusion die. By means of heating elements 10 and 11 of the jacket and the mandrel, respectively, the beginning of solidification is postponed to the place at which the clearance is reversed. The thermoplastic material is guided further between the outer wall of jacket 2 and the inner surface of lip 4 of mandrel 3 in a reverse direction. At the end of the lip 4 the thermoplastic material is subjected to another reversal of the direction of flow (traveling around the end of the lip and back along the outer surface thereof) which is associated with a tangential stretching and finally the extruded tube passes through the drawing device between conveying elements 5 and core 6. By the drawing device, the tube is exposed to forces acting in the direction of the axis and the tube is stretched in a longitudinal direction. The temperature of the thermoplastic material can be controlled to a large extent even after the first reversal of the direction of flow of material by means of rear heating elements 10 situated in the jacket of the extrusion die and by means of heating elements 12 situated within the lip 4 of the mandrel. From the end of the reversed part of the mandrel onward, the extruded tube is cooled by means of cooling device 7 which can be a gas blowing ring, the gas jets of which are directed immediately towards the end of the lip 4. Such a cooling device may be effective along the whole length between mandrel and drawing device if it is provided, for example, with a guiding jacket (not shown in the drawings). The arrangement of a blowing ring provided with a jacket enables the tube to be conveyed through the drawing device independently of the room temperature under definite conditions of temperature.

If the whole of the device or the part following the extruder is arranged in a vertical direction, cooling device 7 can take the form shown in FIGURE 2. Here, a bath is provided in known manner with feed and discharge pipes.

By means of narrowed portions 8 of the clearance between jacket 2 and mandrel 3 of the extrusion die and/or by means of perforated baffle devices 9 the stream of thermoplastic material can be further baffled and divided up into small partial streams before the beginning of solidification. This enables the homogenizing effect of the extruder to be supported and the occurrence of marks in the finished tube to be avoided.

It is particularly advantageous to arrange perforated baffle devices 9 at the end of jacket 2 in the clearance between mandrel 3 and jacket 2 (see FIGURE 3). Alternatively, jacket 2 may be longer so as to reach to the bottom of lip 4 and the end of the jacket may be provided with bore-holes. In this form of apparatus it is suitable to arrange first an enlarged portion having the form of a chamber and, following it, a narrowed portion 8 of the clearance between mandrel and jacket either after perforated baffle device 9 or after the end of the jacket provided with a plurality of bore-holes.

The chief parts of the apparatus may be coaxial with the screw and the whole apparatus may be mounted in a horizontal or a vertical direction. In special cases it may, however, be advantageous to square off the extrusion die. Such a mode of construction is shown by way of example in FIG. 3 which is a sectional view. This mode of construction offers advantages with respect to the support of the mandrel, the accessibility of the clearance and the possibility of arranging the supply and delivery lines of the electrical heating devices or the liquid heat carriers. In this form of apparatus, the perforated baffle device 9 is situated at the place where the clearance is reversed. The extrusion die which is squared off also offers the possibility to arrange additional baffle devices serving to treat the thermoplastic material before it is drawn or stretched.

Another advantage of the process according to the invention is that weak portions which may be present in the extruded tube which has not yet been stretched are not elongated to a higher extent than the rest of the tube as may be the case, for example, when the tube is stretched or previously drawn by being inflated or drawn over a mandrel. For these reasons the use of special equalizing devices such as sleeves or rings can be dispensed with.

The following example serves to illustrate the invention but it is not intended to limit it thereto.

*Example*

In order to prepare a polyethylene tube of practically unlimited length, of an inside diameter of 194 mm. and an outside diameter of 201 mm., a tube of an outside diameter of 60 mm. which had been prepared on a single-screw extruder was subjected to a reversal of direction of 180° around the end of the wall of the extrusion die, the pressure of the extruder being made use of for this purpose. During this operation the thermoplastic material was maintained at a temperature within the range of 180° to 190° C. When the tube left the double guidance between the inverted portion of the mandrel and the outer wall of the extrusion die its diameters were 124 and 142 mm., respectively, which corresponded to the diameters of the annular slot. The temperature of the tube was adjusted so as to be within the range of 175° to 185° C. at this place. The tube was cooled on its further passage by the blowing on of air. When at the second place of inversion the temperature was adjusted so as to be within the range of 80° to 90° C. and the tube was cooled to 30° C. until being seized by the drawing-off device, when 25 kilograms of granular product were supplied per hour and 20.2 cm. of tube were drawn off per minute a tube was obtained which had a creep resistance of about 105 kilograms per square centimeter. When the temperature was further reduced at the second place of reversal considerably higher values of strength could be attained.

We claim:

1. A process for the continuous formation of a thin walled tube of high strength which comprises extruding molten thermoplastic resin through an annular passageway formed between a die and a mandrel, turning the direction of flow of the plastic 180° and outwardly by conducting it through an annular passageway formed by the lip and outside surface of the die and surfaces of the mandrel, again turning the direction of the flow of plastic 180° and outwardly around an external surface of the mandrel, cooling the plastic during the second turning so that it begins to solidify, and simultaneously drawing the thus formed tube away from the extruder.

2. The process of claim 1 in which the cooling is performed by impinging gas upon the thermoplastic.

3. The process of claim 1 in which the cooling is performed by impinging liquid upon the thermoplastic.

References Cited by the Examiner

UNITED STATES PATENTS

| | | | |
|---|---|---|---|
| 2,177,633 | 10/1939 | Blackard | 18—55 |
| 2,663,904 | 12/1953 | Slaughter | 18—55 |
| 3,057,013 | 10/1962 | Loveless | 18—55 |
| 3,066,356 | 12/1962 | Porter | 264—209 |
| 3,069,724 | 12/1962 | Schiedrum | 18—14 |
| 3,079,636 | 3/1963 | Aykanian | 18—14 |
| 3,108,851 | 10/1963 | Hofer et al. | 264—209 |

FOREIGN PATENTS 1,013,865    8/1957    Germany.

ROBERT F. WHITE, *Primary Examiner.*

WILLIAM J. STEPHENSON, ALEXANDER H. BRODMERKEL, *Examiners.*